(12) United States Patent
Li et al.

(10) Patent No.: US 12,299,370 B2
(45) Date of Patent: May 13, 2025

(54) SYSTEMS AND METHODS FOR PROVIDING A DYNAMIC HIGH VOLTAGE CIRCUIT DESIGN WORKFLOW

(71) Applicant: Taiwan Semiconductor Manufacturing Company, Ltd., Hsinchu (TW)

(72) Inventors: Shenggao Li, Cupertino, CA (US); Szu-Chun Tsao, Hsinchu (TW); Wen-Shen Chou, Hsinchu County (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 571 days.

(21) Appl. No.: 17/688,966

(22) Filed: Mar. 8, 2022

(65) Prior Publication Data

US 2023/0023317 A1 Jan. 26, 2023

Related U.S. Application Data

(60) Provisional application No. 63/224,894, filed on Jul. 23, 2021.

(51) Int. Cl.
*G06F 30/392* (2020.01)
*G06F 30/3308* (2020.01)
(Continued)

(52) U.S. Cl.
CPC .......... *G06F 30/392* (2020.01); *G06F 30/398* (2020.01); *G06F 30/3308* (2020.01);
(Continued)

(58) Field of Classification Search
CPC .. G06F 30/392; G06F 30/398; G06F 30/3308; G06F 30/337; G06F 30/367; G06F 30/373; G06F 2119/06
(Continued)

(56) References Cited

U.S. PATENT DOCUMENTS 7,340,710 B1 * 3/2008 Hoerold .................. G06F 30/39
716/120
7,490,309 B1 * 2/2009 Kukal .................... G06F 30/367
716/132

(Continued)

*Primary Examiner* — Phallaka Kik
(74) *Attorney, Agent, or Firm* — Jones Day

(57) ABSTRACT

Systems and methods are provided for designing an integrated circuit device. In one example, a method for designing an integrated circuit device may include the operations of: receiving a schematic diagram of the integrated circuit device; generating, by a simulation program, a first transient simulation of the integrated circuit device based on the schematic diagram; determining from the first transient simulation of the integrated circuit device a plurality of maximum voltage change values between conductor networks (nets) within the schematic diagram of the integrated circuit device; storing the plurality of maximum voltage change values for the schematic diagram of the integrated circuit device in a computer readable medium; and utilizing, by a layout program, the stored plurality of maximum voltage change values to generate a layout design for the integrated circuit device according to one or more high voltage design constraints. In embodiments, the plurality of maximum voltage change values are stored in the form of a matrix in an extensible markup language (XML) file.

20 Claims, 7 Drawing Sheets

(51) Int. Cl.
  *G06F 30/337* (2020.01)
  *G06F 30/367* (2020.01)
  *G06F 30/373* (2020.01)
  *G06F 30/398* (2020.01)
  *G06F 119/06* (2020.01)

(52) U.S. Cl.
  CPC .......... *G06F 30/337* (2020.01); *G06F 30/367* (2020.01); *G06F 30/373* (2020.01); *G06F 2119/06* (2020.01)

(58) Field of Classification Search
  USPC ..... 716/112, 106, 119, 132, 136; 703/14, 15
  See application file for complete search history.

(56) References Cited

U.S. PATENT DOCUMENTS

| | | | |
|---|---|---|---|
| 8,943,454 B1* | 1/2015 | Hsiao | G06F 30/398 716/139 |
| 9,589,085 B1* | 3/2017 | O'Riordan | G06F 30/367 |
| 10,956,650 B1* | 3/2021 | Ku | G06F 30/392 |
| 2004/0268283 A1* | 12/2004 | Perry | G06Q 10/0875 716/139 |
| 2006/0192579 A1* | 8/2006 | Jacobsen | G01R 31/2801 716/137 |
| 2010/0229134 A1* | 9/2010 | Mizuno | G06F 30/398 716/122 |
| 2015/0074627 A1* | 3/2015 | Huang | G06F 30/398 716/107 |
| 2016/0224716 A1* | 8/2016 | Farbiz | G06F 30/36 |
| 2017/0061047 A1* | 3/2017 | He | G06F 17/13 |
| 2019/0384885 A1* | 12/2019 | Lau | G06F 30/398 |

* cited by examiner

| | order | 1 | 2 | 3 | 4 | 5 | 6 | 7 | 8 | 9 |
|---|---|---|---|---|---|---|---|---|---|---|
| | netname | Vdd | Vss | net1 | net2 | net3 | net4 | net5 | Vinp | Vinn |
| | Vmax | 1.98 | 0 | 1.98 | 1.98 | 0.8 | 0.8 | 1.98 | 1.2 | 1.2 |
| | Vmin | 1.62 | 0 | 0 | 1.2 | 0 | 0 | 0 | 0 | 0 |
| | Delta | 1 | 2 | 3 | 4 | 5 | 6 | 7 | 8 | 9 |
| Vdd | 1 | 0 | 1.98 | 1.2 | 0.6 | 1.98 | 1.98 | 1.98 | 0.72 | 0.72 |
| Vss | 2 | | 0 | 1.98 | 1.98 | 0.8 | 0.8 | 1.98 | 1.2 | 1.2 |
| net1 | 3 | | | 0 | 1.98 | v35 | v36 | v37 | v38 | v39 |
| net2 | 4 | | | | 0 | v45 | v46 | v47 | v48 | v49 |
| net3 | 5 | | | | | 0 | v56 | v57 | v58 | v59 |
| net4 | 6 | | | | | | 0 | v67 | v68 | v69 |
| net5 | 7 | | | | | | | 0 | v78 | v79 |
| Vinp | 8 | | | | | | | | 0 | v89 |
| Vinn | 9 | | | | | | | | | 0 |

FIG. 4

SYSTEMS AND METHODS FOR PROVIDING A DYNAMIC HIGH VOLTAGE CIRCUIT DESIGN WORKFLOW

CROSS-REFERENCE TO RELATED APPLICATIONS

This application claims priority to U.S. Provisional Application No. 63/224,894, filed Jul. 23, 2021, which is incorporated herein by reference in its entirety.

TECHNICAL FIELD

The technology described in this patent document relates generally to integrated circuits and integrated circuit design.

BACKGROUND

The recent trend in miniaturizing integrated circuits (ICs) has resulted in smaller devices which consume less power, yet provide more functionality at higher speeds than before. The miniaturization process has also resulted in stricter design and manufacturing specifications, especially for high voltage integrated circuit designs. High voltage integrated circuit design may therefore be challenging, particularly when designing core-only devices (e.g., thin gate devices). Design rule checks are therefore performed during a typical integrated circuit design process to make sure that a semiconductor device can be made and will function as designed.

BRIEF DESCRIPTION OF THE DRAWINGS

Aspects of the present disclosure are best understood from the following detailed description when read with the accompanying figures.

FIG. 4 is an example of an XML file.

DETAILED DESCRIPTION

Figure 1:
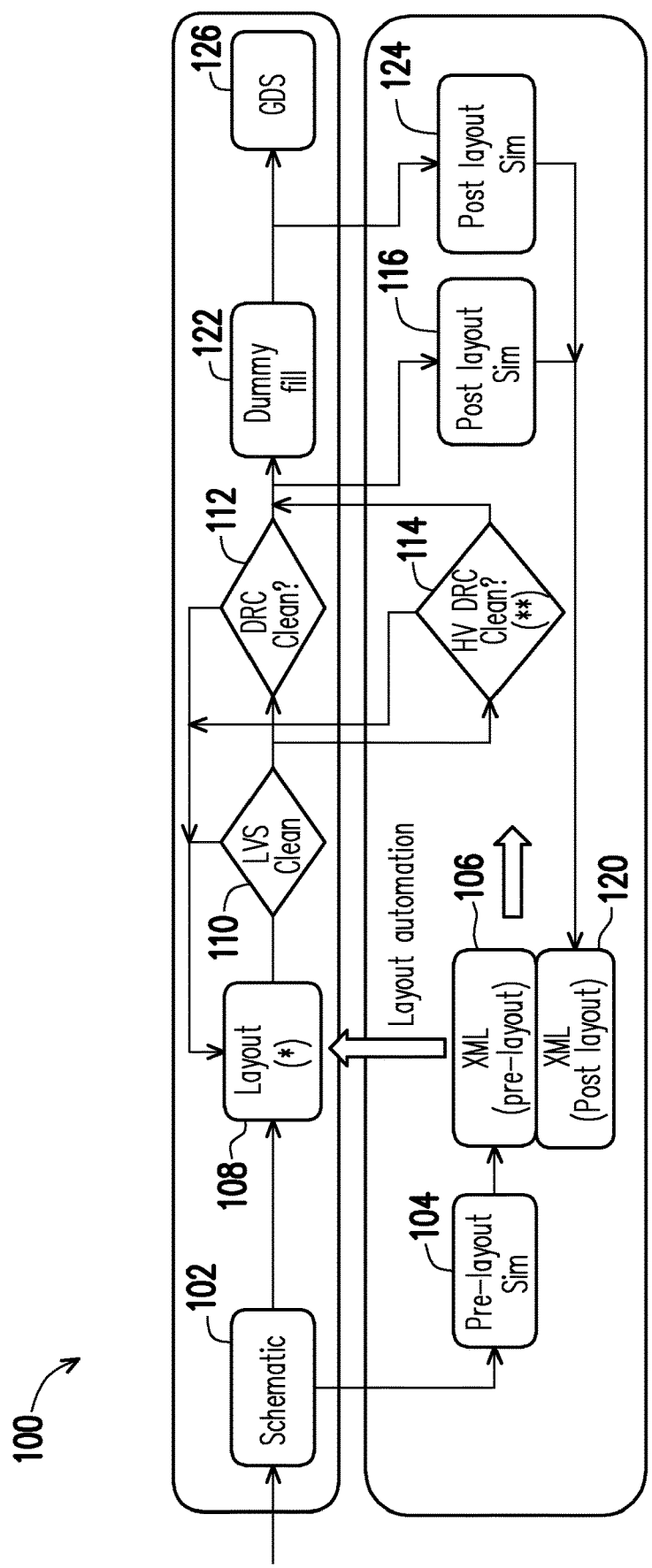
FIG. 1 is a flow diagram of an example design flow for a high voltage integrated circuit design.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

FIG. 1 is a flow diagram of an example design flow 100 for a high voltage integrated circuit design. At block 102, a schematic design file for the high voltage integrated circuit design is received or generated. The schematic design file 102 may, for example, include a schematic diagram of the integrated circuit design, which can be used to generate circuit netlists that describe the components of the integrated circuit and how they are connected. The schematic design file 102 is input to both a simulation program at block 104 and a layout program at block 108.

At block 104 a transient simulation is performed on the schematic design file 102 by a simulation program in order to identify minimum and maximum voltages at each node in the circuit design. For example, the simulation program 104 may process transient waveforms of all nets in the circuit design and extract the resultant minimum and maximum voltages for each net. The minimum and maximum voltages may, for example, be extracted from the simulation results and stored in a non-transitory computer-readable medium in the form of two arrays. In addition, the simulation program 104 may also determine the maximum voltage change (i.e., the "max delta voltage") between any two nets in the circuit design. The max delta voltage values may, for example, be stored in the non-transitory computer-readable medium in the form of a matrix. The minimum and maximum voltage arrays and the max delta voltage matrix for the circuit design may, for example be saved in the form of an extensible markup language (XML) file at block 106. It should be understood that the extraction of the minimum and maximum voltage arrays and max delta voltage matrix from the simulation results into an XML (or other format) file 106 may be performed by the simulation program 104, or in other embodiments, may be performed independent of the simulation program 104. As shown in FIG. 1, the XML file 106 is provided to the layout program 108 along with the schematic design file 102.

The layout program 108 may be a commercially available integrated circuit layout tool. In embodiments, the XML file 106 is provided in a format that is layout tool independent such that the XML file 106 is a compatible input for multiple commercially available integrated circuit layout tools. For example, during the layout process, a layout editor provided by the layout program 108 may be configured to read the XML file 106 and calculate the wire spacing for the integrated circuit design. In embodiments, the wire spacing calculated by the layout program 108 based on the XML file 106 may be provided by the layout editor in "real-time" to guide the layout engineer. In other embodiments, the layout program 108 may perform an automatic layout operation and may utilize the XML file 106 to guide the place and route of devices and nets. For example, the layout program 108 may check the Min/Max voltage in the XML file 106 of any two nodes, and compare against the DRC rules from a foundry provided technology file to identify the min-spacing of two nets. Graphical marking of the min-spacing may, for example, be shown by the layout tool to avoid a rule violation.

At block 110, a layout versus schematic (LVS) check is performed, for example using commercially available electronic design automation (EDA) verification software, to determine whether the integrated circuit layout design generated by the layout software 108 corresponds to the schematic circuit design 102. If the integrated circuit layout does not pass LVS check at block 110, then the process returns to block 108 and corrections are made using the layout software 108.

At block 112, a design rule check (DRC) is performed, for example using commercially available electronic design automation (EDA) verification software, to determine whether the integrated circuit layout design satisfies certain predetermined design constraints, such as minimum width and spacing requirements. If the integrated circuit layout does not pass DRC at block 112, then the process returns to block 108 and corrections are made using the layout software 108.

At block 114, a high-voltage design rule check (HV DRC) is performed to determine whether the integrated circuit layout design satisfies certain predetermined design constraints that are specific to high-voltage integrated circuit designs. The HV DRC 114 may, for example, have more rigid design constraints (e.g., increased minimum width and/or spacing requirements) for certain integrated circuit components that are susceptible to stress and/or failure at high voltages. In embodiments, the high-voltage DRC may be a subset of the standard DRC, with more stringent requirements to avoid a high electrical field between two nets.

Once the integrated circuit layout design has passed the LVS, DRC and HV DRC checks, a post-layout netlist is extracted, and the circuit is re-simulated at block 116. Specifically, at block 116 a transient simulation is performed on the post-layout netlist, for example using the same simulation program as used in block 104. For example, the simulation program at block 116 may process transient waveforms of all nets in the post-layout netlist and extract the resultant minimum and maximum voltages for each net. The minimum and maximum voltages may, for example, be extracted from the simulation results and stored in a non-transitory computer-readable medium in the form of two arrays. In addition, the simulation program at block 116 may also determine the max delta voltage between any two nets in the circuit design. The max delta voltage values may, for example, be stored in the non-transitory computer-readable medium in the form of a matrix.

In embodiments, the simulation program at block 116 may use the node voltage before and after a resistive route to calculate the max delta voltage for added accuracy and efficiency. For example, while one max delta voltage may be calculated per pair of nets at block 104, four calculations may be performed per pair of nets at block 116 for the post-layout netlist. In embodiments, the maximum of the four calculations may be saved for the pair or nets.

The minimum and maximum voltage arrays and the max delta voltage matrix for the post-layout netlist may, for example be saved in the form of an XML file at block 120. It should be understood that the extraction of the minimum and maximum voltage arrays and max delta voltage matrix from the simulation of the post-layout netlist into an XML (or other format) file 120 may be performed by the simulation program, or in other embodiments, may be performed independent of the simulation program.

The post-layout XML file 120 is passed to the layout program 108 and is used to perform a HV DRC check at block 114. Any HV constraint violations in the post-layout simulation that are identified by the HV DRC 114 may be reported to the layout engineer and/or to an automatic layout program. Identified HV DRC violations may, for example, require a schematic level circuit change and/or modification of the layout design at block 108. This process may be repeated until a clean HR DRC check 114 of the post-layout netlist is achieved.

At block 122, dummy fill structures or layers may be added to the layout design, for example to increase pattern density and/or improve layer thickness uniformity. For example, at block 122, one or more dummy metal or poly layers may be applied to the layout design. During this dummy fill process 122, the last-created XML file 106, 120 may be used to avoid filling dummy pattern in the wrong location.

To ensure that no rule violations are introduced as a result of the dummy fill operation 122, another post-layout netlist is extracted, and the circuit is simulated again at block 124. Again, at block 124, a transient simulation is performed on the post-layout netlist, for example using the same simulation program as used in blocks 104 and 116. The simulation program at block 124 may, for example, process transient waveforms of all nets in the post-layout netlist, extract the resultant minimum and maximum voltages for each net, and determine the max delta voltage between any two nets in the circuit design The minimum and maximum voltages may, for example, be stored in a non-transitory computer-readable medium in the form of two arrays, and the max delta voltage values may, for example, be stored in the non-transitory computer-readable medium in the form of a matrix.

The minimum and maximum voltage arrays and the max delta voltage matrix for the post-layout netlist following dummy fill 122 may, for example be saved in the form of an XML file at block 120, and used by the layout program 108 to perform another HV DRC check at block 114. Again, any HV constraint violations in the post-layout simulation that are identified by the HV DRC 114 may be reported to the layout engineer and/or to an automatic layout program for correction. This process may be repeated until a clean HR DRC check 114 of the post-layout netlist following dummy fill is achieved. The resultant layout design may then be output form the workflow 100, for example in the form of a GDS (graphic data system) design file 126.

Figure 2:
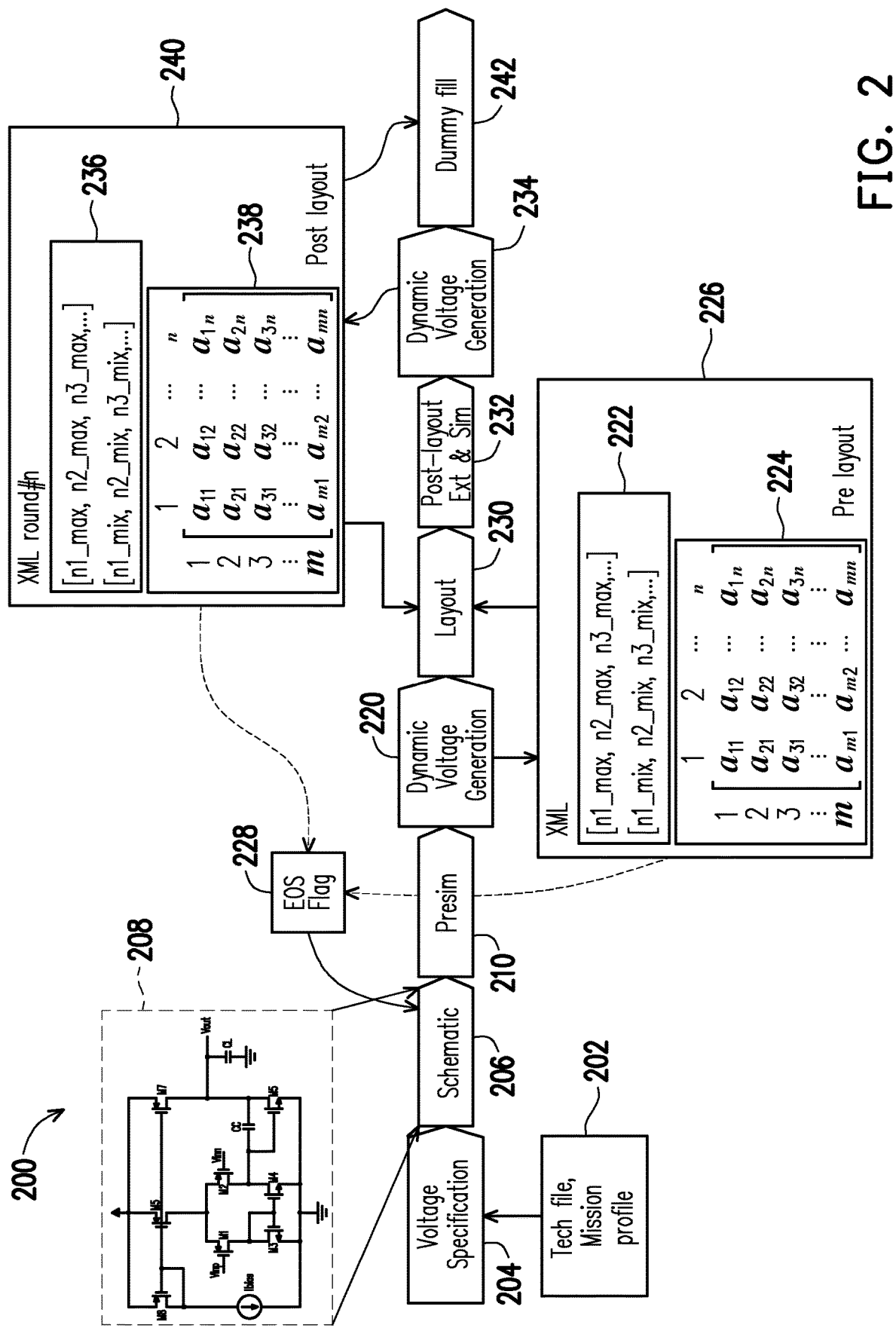
FIG. 2 is a flow diagram of another example design flow for a high voltage integrated circuit design.

FIG. 2 is a flow diagram of another example design flow 200 for a high voltage integrated circuit design. At block 202, the design flow 200 receives a user input or file that identifies a mission profile for the integrated circuit design. For example, a mission profile may indicate whether the integrated circuit design is for use in a dangerous or extreme environment and requires higher reliability or is for use in a commercial application, such as a cellular phone or other consumer product. The mission profile 202 may, for example, be used to set one or more design rules and/or other design components, parameters or specifications. In addition, at block 202, the design flow 200 may also receive a technical file or user input that identifies one or more design constraints or parameters, such as for example identifying maximum voltage constraints for one or more components or nets in the high voltage integrated circuit design.

At block 204, a voltage specification for the high voltage integrated circuit is received or generated. The voltage specification 204 may, for example, provide the input and output voltage parameters for the circuit design.

At block 206, a schematic design file for the high voltage integrated circuit design is received or generated. The schematic design file 206 may, for example, include a schematic diagram 208 of the integrated circuit design, which can be used to generate circuit netlists that describe the components of the integrated circuit and how they are connected. An example of a schematic diagram 208 for an integrated circuit design is shown in FIG. 3.

Figure 3:
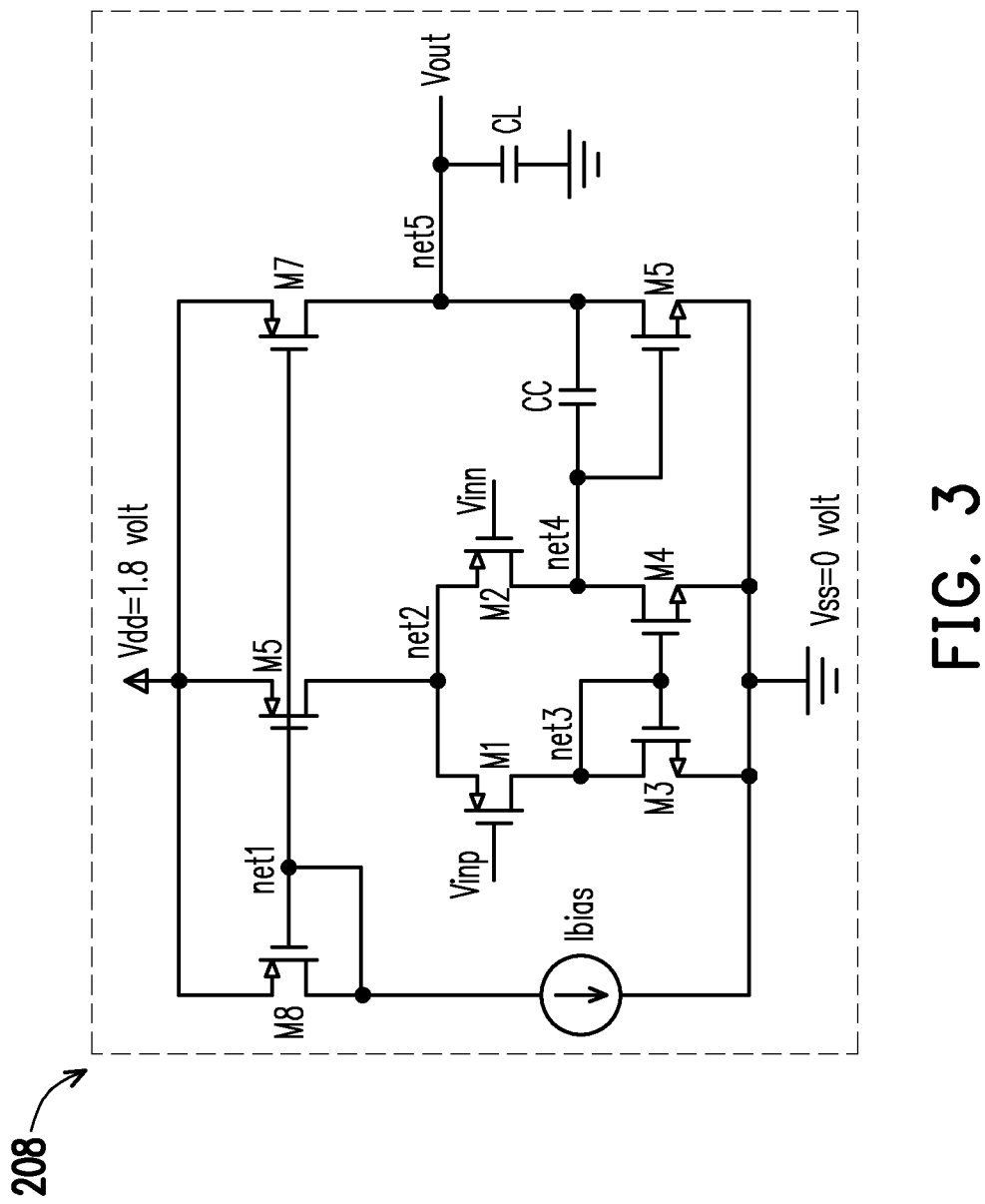
FIG. 3 is an example of a schematic diagram for a high voltage integrated circuit design.

As shown in the example illustrated in FIG. 3, a schematic diagram for an integrated circuit design includes circuit components (e.g., M1-M8, CC, CL, Ibias) that are connected by conductive wires or traces. The conductive wires or traces that connect the circuit components may be grouped into a number of conductive networks or "nets." The schematic diagram 208 in the illustrated embodiment includes five nets, labeled net1-net5.

With reference again to FIG. 2, at block 210 a transient simulation is performed on the schematic design file 206 by a simulation program in order to identify minimum and maximum voltages at each node in the circuit design. For example, the simulation program 206 may process transient waveforms of all nets in the circuit design. At block 220, dynamic voltage generation program 220 is used to extract the minimum and maximum voltages for each net from the simulation results. The minimum and maximum voltages may, for example, be extracted from the simulation results and stored in a non-transitory computer-readable medium in the form of two arrays 222. In addition, the dynamic voltage generation program 220 may also determine the maximum voltage change (i.e., the "max delta voltage") between any two nets in the circuit design from the simulation results. The max delta voltage values may, for example, be stored in the non-transitory computer-readable medium in the form of a matrix 224. The minimum and maximum voltage arrays 222 and the max delta voltage matrix 224 for the circuit design may, for example be saved in the form of an XML file 226. As shown in FIG. 2, the XML file 226 is provided to a layout program 230.

The layout program 230 may be a commercially available integrated circuit layout tool. In embodiments, the XML file 226 is provided in a format that is layout tool independent such that the XML file 226 is a compatible input for multiple commercially available integrated circuit layout tools. For example, during the layout process, a layout editor provided by the layout program 230 may be configured to read the XML file 226 and calculate the wire spacing for the integrated circuit design. In embodiments, the wire spacing calculated by the layout program 230 based on the XML file 226 may be provided by the layout editor in "real-time" to guide the layout engineer. In other embodiments, the layout program 230 may perform an automatic layout operation and may utilize the XML file 226 to guide the place and route of devices and nets.

The XML file 226 may, for example, be used during manual or auto-route to perform a dynamic HV DRC check in order to enable automatic metal spacing, device placement or guard-ring placement, and to provide an initial HV DRC verification for the resultant placement design. In addition, the XML file 226 may be used to identify electrical overstress (EOS) conditions in the integrated circuit design. For example, the max delta voltage matrix in the XML file 226 may be reduced to a triangle matrix, and high voltage violations may be identified by comparing this matrix with predetermined voltages specified in the a technical file 202. Identified high voltage violations may, for example, be included in an EOS flag 228, which may be utilized to make a schematic level circuit change to address the resultant violations. In embodiments, EOS conditions may be identified using the combination of the XML file 226 (e.g., the voltage information between two nets), and the technical file 226 (e.g., DRC rules that show for a given metal, or device, what is the minimal spacing between two different nets to avoid EOS). If the spacing is lower than the min-spacing, an EOS flag 228 may be set in a log file to indicate that the layout violates a DRC rule. If the layout tool is interactive, the tool may, for example, show a graphic marking in the GUI indicating that the spacing is too small, causing EOS violations. Layout engineers may, for example, adjust spacing in real time. If the layout tool is auto-route, then the tool may, for example, adjust the spacing to meet minimal spacing requirements.

An illustrative example of an XML file 300 is shown in FIG. 4. The table shown in FIG. 4 illustrates example minimum and maximum voltage arrays 302, 304 and a max delta voltage matrix 306 for the nets in the example circuit shown in FIG. 3. The example table 300 shown in FIG. 4 may, for example, be stored in a computer readable medium in XML, format. As shown in the illustrated example, in embodiments, max delta voltage values may be determined for only half of the vectors in the max delta voltage matrix 306. The other half of the vectors in the matrix 306 may be inferred because $\alpha_{xy}=\alpha_{yx}$. It should also be noted that, for simplicity, the table shown in the illustrated example 300 does not include specific voltage values for vectors v35-v39, v45-v49, v56-v59, v67-v69, v78-v79, and v89, and these vectors values are instead represented by symbols for convenience.

In the example 300 illustrated in FIG. 4, the max delta voltage 308 between net2 and Vdd has a value of 0.6V. This shows that the worst case voltage difference between net2 and Vdd during dynamic simulation is only 0.6V. Thus, in this example, a high-voltage design rule may not apply to the route between net2 and Vdd. On the other hand, the illustrated example shows, for example, a max delta voltage 310 of 1.98V between net5 and Vdd, which may indicate that a high voltage design rule will need to be accommodated for the route between net5 and Vdd.

With reference again to FIG. 2, once the integrated circuit layout design has been completed by the layout program 230 and has passed the HV DRC check, a post-layout netlist is extracted and the circuit is re-simulated at block 232. Specifically, at block 232 a transient simulation is performed on the post-layout netlist, for example using the same simulation program as used in block 210. For example, the simulation program at block 232 may process transient waveforms of all nets in the post-layout netlist.

At block 234, a dynamic voltage generation program is used to extract the minimum and maximum voltages for each net from the simulation results. The minimum and maximum voltages may, for example, be extracted from the post-layout simulation results and stored in a non-transitory computer-readable medium in the form of two arrays 236. In addition, the dynamic voltage generation program at block 234 may also determine the max delta voltage between any two nets in the circuit design from the post-layout simulation results. The max delta voltage values may, for example, be stored in the non-transitory computer-readable medium in the form of a matrix 238. The minimum and maximum voltage arrays 236 and the max delta voltage matrix 238 for the circuit design may, for example be saved in the form of an XML file 240. The extraction of the min, max, and max delta voltages and the creation and storage of the XML file 240 at block 234 may, for example, be performed by the same dynamic voltage generation software as used in block 220 for the pre-layout simulation results.

In embodiments, the dynamic voltage generation software at block 234 may use the node voltage before and after a resistive route to calculate the max delta voltage for added accuracy and efficiency. For example, while one max delta voltage may be calculated per pair of nets at block 220, four calculations may be performed per pair of nets at block 234 for the post-layout netlist. In embodiments, the maximum of the four calculations may be saved for the pair or nets.

As shown in FIG. 2, the post-layout XML file 240 is fed back to a layout program 230, and is used to perform a post-layout HV DRC verification. Any HV constraint violations in the post-layout simulation that are identified by the post-layout HV DRC verification may be reported to the layout engineer and/or used by an automatic layout program to make corrections to the layout design. Identified HV DRC violations may, for example, be included in an EOS flag 228, and may require a schematic level circuit change and/or modification of the layout design. This process may be repeated until a clean HR DRC verification of the post-layout netlist is achieved.

Figure 5:
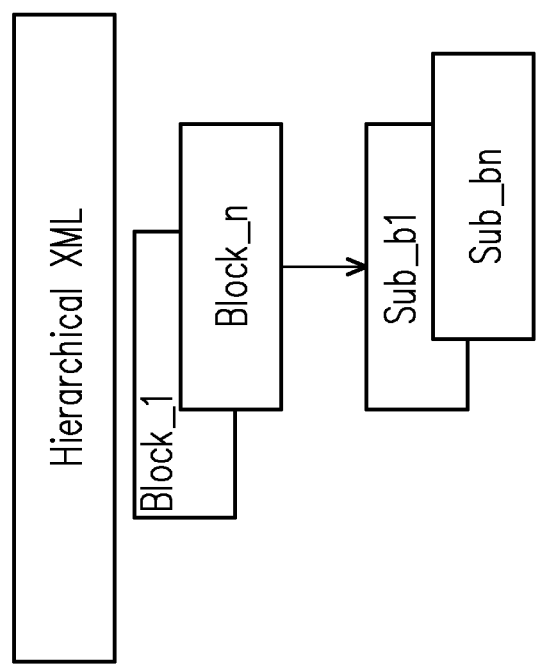
FIG. 5 is an example of a hierarchical XML file.

In embodiments, the XML file 240 generated at block 234 may include a plurality of hierarchical XML files, for example with an XML file being generated for each of multiple sub-blocks within the layout design, as shown for example in FIG. 5. With multiple XML files generated for each sub-block, the XML, files 240 may be utilized in a hierarchical manner to perform a layout HV DRC verification at top level. In embodiments, the XML file 240 may be generated at a certain hierarchy to override an XML file at a sub-cell level. In embodiments, the minimum and maximum voltages in the XML file 240 may be used for inter-block routes (for example if the max delta voltages of two neighboring blocks are not available.)

For example, when there are multiple blocks, each block may have its own XML from simulation, and the voltage information for each block may be saved in the XML file 240. If the nets of two blocks are to be routed at higher metal layers, they also need to satisfy the DRC rules to avoid high voltage EOS stress. The voltage information of each net may therefore be determined from its corresponding XML file 240, and the delta voltage may be calculated between two arbitrary nets. In embodiment, the absolute voltage difference may be used to route any two nets side by side. In certain embodiments, two nets might be simulated by different block owners and stored in different block XML files. For example, net1 in Block1.XML and net2 in Block2.XML. Consider, for example, if net 1 has 0 to 1.8 volts, and net 2 has 0 to 2.5 volts, then the worst case delta voltage V12 would be 2.5 volts. In this example, there might be situations where 2.5 volts on net2 will appear with 1.8 volts on net1 (hence delta is only 0.7 volts), but we don't really have this data available because block1 and block2 were simulated by different owners separately. Thus, if we want to have the exact voltage difference on net1 and net2, the system may, for example, simulate block1 and block2 together at a higher hierarchy.

In embodiments, the XML files may be manually edited to add a user defined max delta voltage. For instance, using the above example, if it is known that net1 and net2 will have a max delta voltage of 0.7 volt, instead of the worst cast max voltage of 2.5, a statement may be added to the XML file to indicate the delta voltage between net1 and net2 is 0.7, such that a regular standard DRC rule will be applied between the two nets.

With reference again to FIG. 2, at block 242, dummy fill structures or layers may be added to the layout design, for example to increase pattern density and/or improve layer thickness uniformity. For example, at block 242, one or more dummy metal or poly layers may be applied to the layout design. During this dummy fill process 242, the last-created XML file 240 may be used to avoid filling dummy pattern in the wrong location. As shown, the post-layout XML file 240 may also be provided to dummy fill block 242 to perform another post-layout HV DRC verification. Any HV constraint violations in the post-layout simulation that are identified at block 242 may be reported to the layout engineer and/or used by an automatic layout program to make corrections to the layout design. This process may be repeated until a clean HR DRC verification is achieved.

Figure 6:
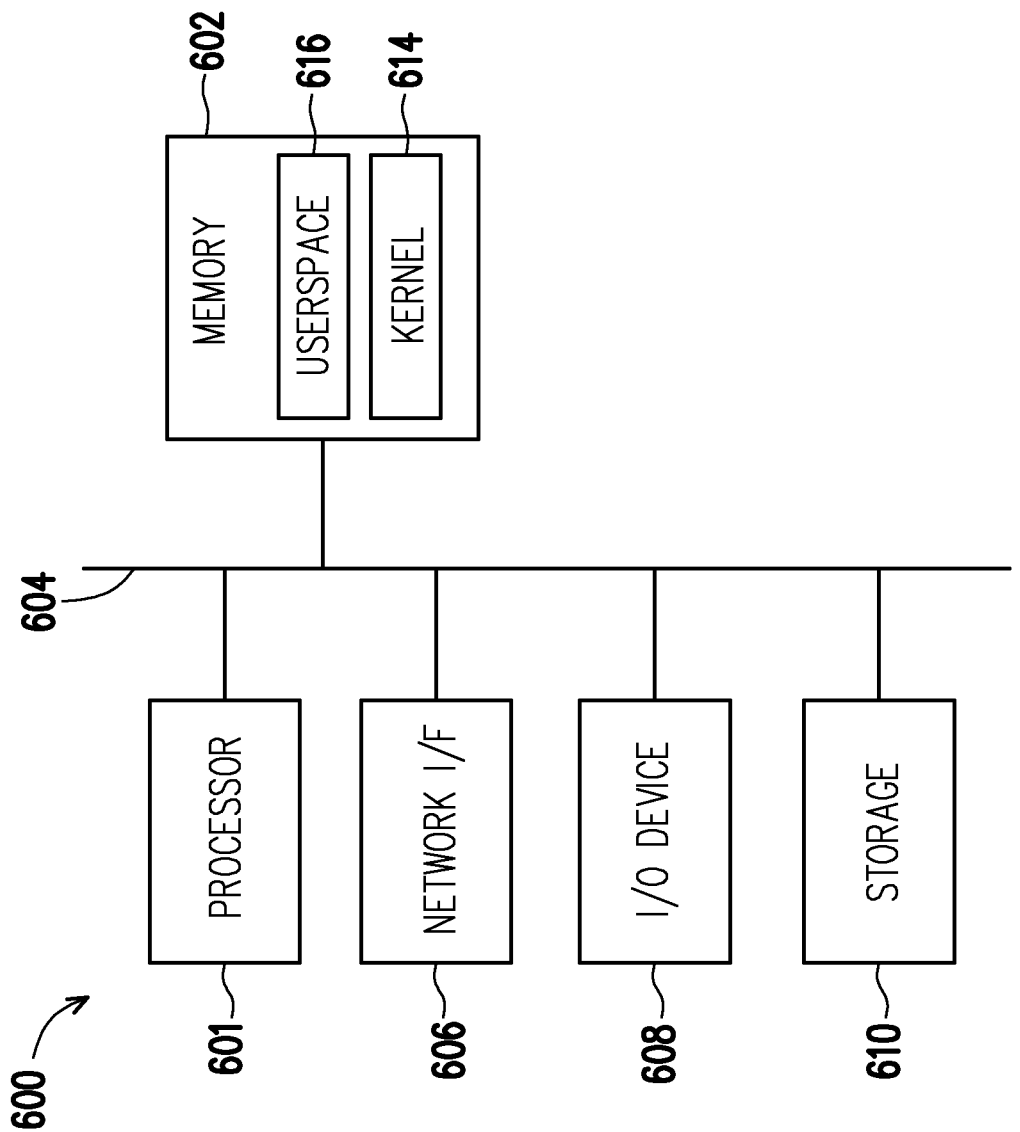
FIG. 6 is a block diagram of an example computer system.

FIG. 6 is a block diagram of a computer system 600 in accordance with some embodiments. One or more of the programs and/or systems and/or operations described with respect to FIGS. 1-5 is realized in some embodiments by one or more computer systems 600 of FIG. 6. The system 600 comprises at least one processor 601, a memory 602, a network interface (I/F) 607, a storage 610, an input/output (I/O) device 608 communicatively coupled via a bus 604 or other interconnection communication mechanism.

The memory 602 comprises, in some embodiments, a random access memory (RAM) and/or other dynamic storage device and/or read only memory (ROM) and/or other static storage device, coupled to the bus 604 for storing data and/or instructions to be executed by the processor 601, e.g., kernel 614, userspace 616, portions of the kernel and/or the userspace, and components thereof. The memory 602 is also used, in some embodiments, for storing temporary variables or other intermediate information during execution of instructions to be executed by the processor 601.

In some embodiments, a storage device 610, such as a magnetic disk or optical disk, is coupled to the bus 604 for storing data and/or instructions, e.g., kernel 614, userspace 617, etc. The I/O device 608 comprises an input device, an output device and/or a combined input/output device for enabling user interaction with the system 600. An input device comprises, for example, a keyboard, keypad, mouse, trackball, trackpad, and/or cursor direction keys for communicating information and commands to the processor 601. An output device comprises, for example, a display, a printer, a voice synthesizer, etc. for communicating information to a user.

In some embodiments, one or more operations and/or functionality of the programs and/or systems described with respect to FIGS. 1-5 are realized by the processor 601, which is programmed for performing such operations and/or functionality. One or more of the memory 602, the I/F 606, the storage 610, the I/O device 608, the hardware components 618, and the bus 604 is/are operable to receive instructions, data, design rules, netlists, layouts, models and/or other parameters for processing by the processor 601.

In some embodiments, one or more of the operations and/or functionality of the programs and/or systems described with respect to FIGS. 1-5 is/are implemented by specifically configured hardware (e.g., by one or more application specific integrated circuits (ASICs) which is/are included) separate from or in lieu of the processor 601. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
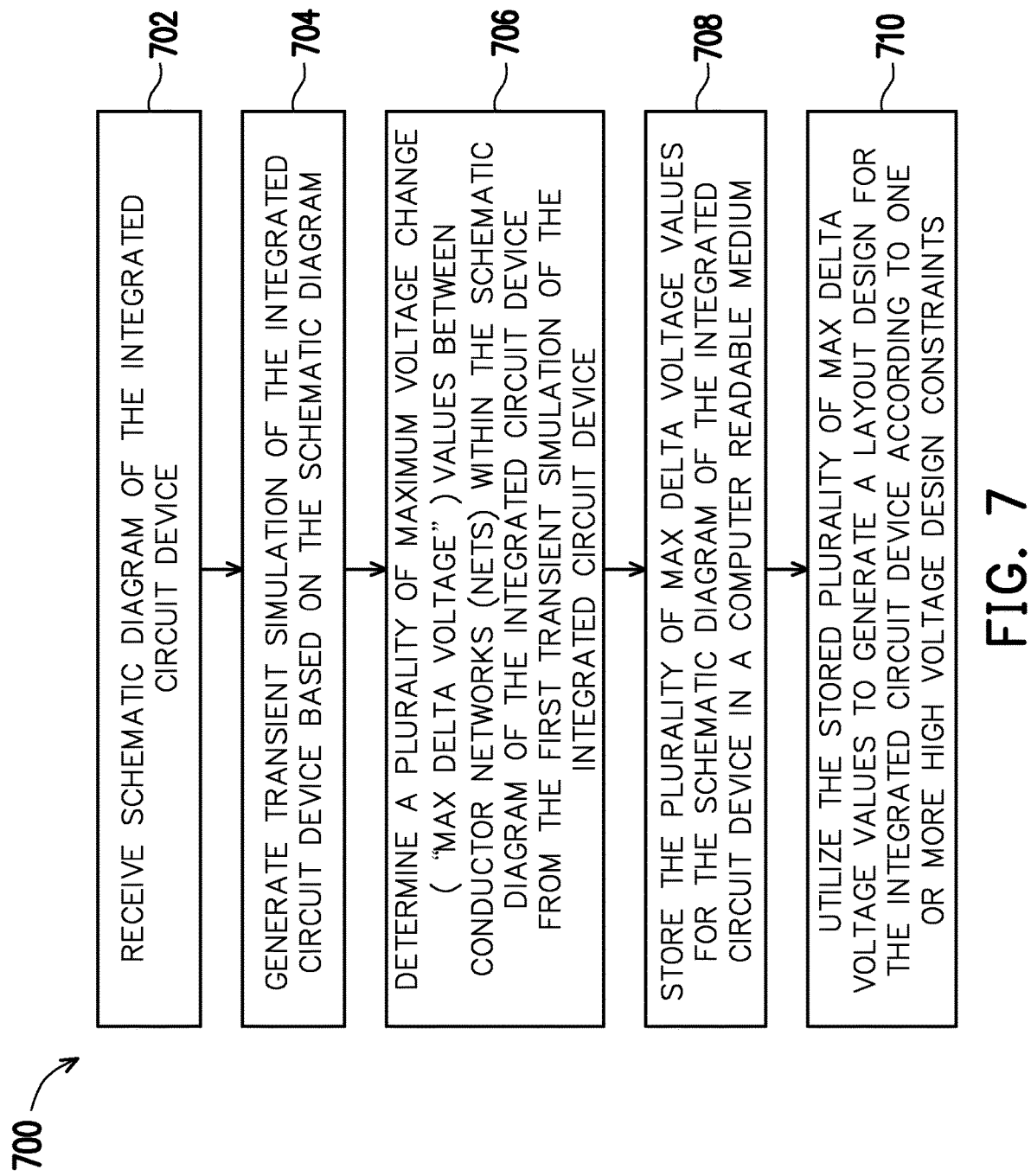
FIG. 7 is a flow diagram of an example method for designing an integrated circuit device.

FIG. 7 is a flow diagram illustrating an example method 700 for designing an integrated circuit device. At 702, a schematic diagram of the integrated circuit device is received. At 704, a transient simulation of the integrated circuit device is generated by a simulation program based on the schematic diagram. At 706, a plurality of maximum voltage change ("max delta voltage") values between conductor networks (nets) within the schematic diagram of the integrated circuit device are determining from the first transient simulation of the integrated circuit device. At 708, the plurality of max delta voltage values for the schematic diagram of the integrated circuit device are stored in a computer readable medium. At 710, the stored plurality of max delta voltage values are utilized by a layout program to generate a layout design for the integrated circuit device according to one or more high voltage design constraints.

Systems and methods as described herein may take a variety of forms. In one example, a method for designing an integrated circuit device may include the operations of: receiving a schematic diagram of the integrated circuit device (see, e.g., block 102 in FIG. 1 and block 206 in FIG. 2); generating, by a simulation program, a first transient simulation of the integrated circuit device based on the schematic diagram (see, e.g., block 104 in FIG. 1 and block 210 in FIG. 2); determining from the first transient simulation of the integrated circuit device a plurality of maximum voltage change values between conductor networks (nets) within the schematic diagram of the integrated circuit device (see, e.g., block 106 in FIG. 1, block 220 and XML file 226 in FIG. 2, and FIG. 4); storing the plurality of maximum voltage change values for the schematic diagram of the integrated circuit device in a computer readable medium (see, e.g., block 106 in FIG. 1, block 220 and XML file 226 in FIG. 2, and FIG. 4); and utilizing, by a layout program, the stored plurality of maximum voltage change values to generate a layout design for the integrated circuit device according to one or more high voltage design constraints (see, e.g., blocks 108 and 114 in FIG. 1 and block 230 in FIG. 2). In embodiments, the plurality of maximum voltage change values are stored in the form of a matrix in an extensible markup language (XML) file.

In embodiments, a method for designing an integrated circuit device may include the further operations of: determining from the first transient simulation of the integrated circuit device a plurality of minimum voltage values and maximum voltage values at nodes within the schematic diagram of the integrated circuit device (see, e.g., block 106 in FIG. 1, block 220 and XML file 226 in FIG. 2, and FIG. 4); storing the plurality of minimum voltage values and maximum voltage values in the computer readable medium (see, e.g., block 106 in FIG. 1, block 220 and XML file 226 in FIG. 2, and FIG. 4); and utilizing, by the layout program, the stored plurality of minimum voltage values and maximum voltage values to generate the layout design for the integrated circuit device according to one or more high voltage design constraints (see, e.g., blocks 108 and 114 in FIG. 1 and block 230 in FIG. 2). In embodiments, the plurality of minimum voltage values and maximum voltage values are stored in the form of arrays in an extensible markup language (XML) file.

In embodiments, a method for designing an integrated circuit device may include the further operations of: generating, by the simulation program, a second transient simulation of the integrated circuit device based on the layout design (see, e.g., block 115 of FIG. 1 and block 232 of FIG. 2); determining from the second transient simulation of the integrated circuit device a second plurality of maximum voltage change values between conductor networks (nets) within the layout design for the integrated circuit device (see, e.g., block 120 of FIG. 1 and blocks 234 and XML file 240 of FIG. 2); storing the second plurality of maximum voltage change values in a computer readable medium (see, e.g., block 120 of FIG. 1 and blocks 234 and XML file 240 of FIG. 2); and utilizing, by the layout program, the stored second plurality of maximum voltage change values to modify the layout design for the integrated circuit device to comply with the one or more high voltage design constraints (see, e.g., blocks 108 and 114 in FIG. 1 and block 230 in FIG. 2). In embodiments, the second plurality of maximum voltage change values are stored in the form of a matrix in an extensible markup language (XML) file.

In embodiments, a method for designing an integrated circuit device may include the further operations of: determining from the second transient simulation of the integrated circuit device a plurality of minimum voltage values and maximum voltage values at nodes within the layout design for the integrated circuit (see, e.g., block 120 of FIG. 1 and blocks 234 and XML file 240 of FIG. 2); storing the plurality of minimum voltage values and maximum voltage values in the computer readable medium (see, e.g., block 120 of FIG. 1 and blocks 234 and XML file 240 of FIG. 2); and utilizing, by the layout program, the stored plurality of minimum voltage values and maximum voltage values to modify the layout design for the integrated circuit device to comply with the one or more high voltage design constraints (see, e.g., blocks 108 and 114 in FIG. 1 and block 230 in FIG. 2). In embodiments, the plurality of minimum voltage values and maximum voltage values are stored in the form of arrays in an extensible markup language (XML) file.

In embodiments, a method for designing an integrated circuit device may include the further operations of: adding, by the layout program, one or more dummy fill structures or layers to the layout design for the integrated circuit device (see, e.g., block 122 of FIG. 1 and block 242 of FIG. 2); and utilizing the stored second plurality of maximum voltage change values to verify that the layout design with the added one or more dummy fill structures or layers satisfies the one or more high voltage design constraints (see, e.g., block 122, 124 and 120 of FIG. 1 and block 242 of FIG. 2).

In embodiments, the simulation program and the layout program are included in electronic design automation software, and the plurality of maximum voltage change values are determined and stored by a dynamic voltage generation program that is independent of the electronic design automation software.

In one example, a system for designing an integrated circuit device may include a simulation program (see, e.g., block 104 of FIG. 1 and block 210 of FIG. 2), a dynamic voltage generation program (see, e.g., block 106 of FIG. 1 and block 220 of FIG. 2), and a layout program (see, e.g., block 108 of FIG. 1 and block 230 of FIG. 2). The simulation program may be stored on one or more computer readable medium and executable by one or more processors. The simulation program may be configured to, receive a schematic diagram of the integrated circuit device, and generate a first transient simulation of the integrated circuit device based on the schematic diagram. The dynamic voltage generation program may be stored on the one or more computer readable medium and executable by the one or more processors. The dynamic voltage generation program may be configured to, determine from the first transient simulation of the integrated circuit device a plurality of maximum voltage change values between conductor networks (nets) within the schematic diagram of the integrated circuit device, and store the plurality of maximum voltage change values for the schematic diagram of the integrated circuit device in a computer readable medium. The layout program may be stored on the one or more computer readable medium and executable by the one or more processors. The layout program may be configured to utilize the stored plurality of maximum voltage change values to generate a layout design for the integrated circuit device according to one or more high voltage design constraints. In embodiments, the plurality of maximum voltage change values are stored in the form of a matrix in an extensible markup language (XML) file.

In embodiments, a dynamic voltage generation program may be further configured to, determine from the first transient simulation of the integrated circuit device a plurality of minimum voltage values and maximum voltage values at nodes within the schematic diagram of the integrated circuit device, and store the plurality of minimum voltage values and maximum voltage values in the computer readable medium. The stored plurality of minimum voltage values and maximum voltage values may be utilized to generate the layout design for the integrated circuit device according to one or more high voltage design constraints. In embodiments, the plurality of minimum voltage values and maximum voltage values are stored in the form of arrays in an extensible markup language (XML) file.

In embodiments, a simulation program may be further configured to generate a second transient simulation of the integrated circuit device based on the layout design, and a dynamic voltage generation program may be further configured to, determine from the second transient simulation of the integrated circuit device a second plurality of maximum voltage change values between conductor networks (nets) within the layout design for the integrated circuit device, and store the second plurality of maximum voltage change values in a computer readable medium. The stored second plurality of maximum voltage change values to may be utilized to modify the layout design for the integrated circuit device to comply with the one or more high voltage design constraints. In embodiments, the second plurality of maximum voltage change values are stored in the form of a matrix in an extensible markup language (XML) file.

In embodiments, a dynamic voltage generation program may be further configured to, determine from the second transient simulation of the integrated circuit device a plurality of minimum voltage values and maximum voltage values at nodes within the layout design for the integrated circuit, and store the plurality of minimum voltage values and maximum voltage values in the computer readable medium. The stored plurality of minimum voltage values and maximum voltage values may be utilized to modify the layout design for the integrated circuit device to comply with the one or more high voltage design constraints. In embodiments, the plurality of minimum voltage values and maximum voltage values are stored in the form of arrays in an extensible markup language (XML) file.

In embodiments, the layout program may be further configured to add one or more dummy fill structures or layers to the layout design for the integrated circuit device, and the stored second plurality of maximum voltage change values may be utilized to verify that the layout design with the added one or more dummy fill structures or layers satisfies the one or more high voltage design constraints.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for designing an integrated circuit device, comprising:
   receiving a schematic diagram of the integrated circuit device;
   generating, by a simulation program, a first transient simulation of the integrated circuit device based on the schematic diagram;
   determining from the first transient simulation of the integrated circuit device a plurality of maximum voltage change values between conductor networks within the schematic diagram of the integrated circuit device;
   storing the plurality of maximum voltage change values for the schematic diagram of the integrated circuit device in a computer readable medium, wherein a first maximum voltage change value of the plurality of maximum voltage change value includes a difference between a maximum voltage value at a first node and a maximum voltage value at a second node; and
   utilizing, by a layout program, the stored plurality of maximum voltage change values to generate a layout design for the integrated circuit device according to one or more high voltage design constraints.

2. The method of claim 1, wherein the plurality of maximum voltage change values are stored in the form of a matrix in an extensible markup language (XML) file.

3. The method of claim 1, further comprising:
   determining from the first transient simulation of the integrated circuit device a plurality of minimum voltage values and maximum voltage values at nodes within the schematic diagram of the integrated circuit device;
storing the plurality of minimum voltage values and maximum voltage values in the computer readable medium; and
   utilizing, by the layout program, the stored plurality of minimum voltage values and maximum voltage values to generate the layout design for the integrated circuit device according to one or more high voltage design constraints.

4. The method of claim 3, wherein the plurality of minimum voltage values and maximum voltage values are stored in the form of arrays in an extensible markup language (XML) file.

5. The method of claim 1, further comprising:
   generating, by the simulation program, a second transient simulation of the integrated circuit device based on the layout design;
   determining from the second transient simulation of the integrated circuit device a second plurality of maximum voltage change values between conductor networks within the layout design for the integrated circuit device;
   storing the second plurality of maximum voltage change values in a computer readable medium; and
   utilizing, by the layout program, the stored second plurality of maximum voltage change values to modify the layout design for the integrated circuit device to comply with the one or more high voltage design constraints.

6. The method of claim 5, wherein the second plurality of maximum voltage change values are stored in the form of a matrix in an extensible markup language (XML) file.

7. The method of claim 5, further comprising:
   determining from the second transient simulation of the integrated circuit device a plurality of minimum voltage values and maximum voltage values at nodes within the layout design for the integrated circuit;
   storing the plurality of minimum voltage values and maximum voltage values in the computer readable medium; and
   utilizing, by the layout program, the stored plurality of minimum voltage values and maximum voltage values to modify the layout design for the integrated circuit device to comply with the one or more high voltage design constraints.

8. The method of claim 7, wherein the plurality of minimum voltage values and maximum voltage values are stored in the form of arrays in an extensible markup language (XML) file.

9. The method of claim 5, further comprising:
   adding, by the layout program, one or more dummy fill structures or layers to the layout design for the integrated circuit device; and
   utilizing the stored second plurality of maximum voltage change values to verify that the layout design with the added one or more dummy fill structures or layers satisfies the one or more high voltage design constraints.

10. The method of claim 1, wherein
   the simulation program and the layout program are included in electronic design automation software, and
   the plurality of maximum voltage change values are determined and stored by a dynamic voltage generation program that is independent of the electronic design automation software.

11. A computing system for designing an integrated circuit device, comprising:
   one or more non-transitory computer readable medium configured to store program instructions;
   one or more processors, configured to execute the program instructions to design the integrated circuit device, the program instructions comprising:
      a simulation program configured to,
         receive a schematic diagram of the integrated circuit device, and
         generate a first transient simulation of the integrated circuit device based on the schematic diagram;
      a dynamic voltage generation program configured to,
         determine from the first transient simulation of the integrated circuit device a plurality of maximum voltage change values between conductor networks within the schematic diagram of the integrated circuit device, and
         store the plurality of maximum voltage change values for the schematic diagram of the integrated circuit device in a computer readable medium, wherein a first maximum voltage change value of the plurality of maximum voltage change value includes a difference between a maximum voltage value at a first node and a maximum voltage value at a second node; and
      a layout program configured to utilize the stored plurality of maximum voltage change values to generate a layout design for the integrated circuit device according to one or more high voltage design constraints.

12. The computing system of claim 11, wherein the plurality of maximum voltage change values are stored in the form of a matrix in an extensible markup language (XML) file.

13. The computing system of claim 11,
   wherein the dynamic voltage generation program is further configured to,
      determine from the first transient simulation of the integrated circuit device a plurality of minimum voltage values and maximum voltage values at nodes within the schematic diagram of the integrated circuit device, and
      store the plurality of minimum voltage values and maximum voltage values in the computer readable medium; and
   wherein the stored plurality of minimum voltage values and maximum voltage values to utilized to generate the layout design for the integrated circuit device according to one or more high voltage design constraints.

14. The computing system of claim 13, wherein the plurality of minimum voltage values and maximum voltage values are stored in the form of arrays in an extensible markup language (XML) file.

15. The computing system of claim 11,
   wherein the simulation program is further configured to generate a second transient simulation of the integrated circuit device based on the layout design;
   wherein the dynamic voltage generation program is further configured to,
      determine from the second transient simulation of the integrated circuit device a second plurality of maximum voltage change values between conductor networks within the layout design for the integrated circuit device, and
      store the second plurality of maximum voltage change values in a computer readable medium; and
   wherein the stored second plurality of maximum voltage change values to are utilized to modify the layout design for the integrated circuit device to comply with the one or more high voltage design constraints.

16. The computing system of claim 15, wherein the second plurality of maximum voltage change values are stored in the form of a matrix in an extensible markup language (XML) file.

17. The computing system of claim 15,
   wherein the dynamic voltage generation program is further configured to,
      determine from the second transient simulation of the integrated circuit device a plurality of minimum voltage values and maximum voltage values at nodes within the layout design for the integrated circuit, and
      store the plurality of minimum voltage values and maximum voltage values in the computer readable medium; and
   wherein the stored plurality of minimum voltage values and maximum voltage values are utilized to modify the layout design for the integrated circuit device to comply with the one or more high voltage design constraints.

18. The computing system of claim 17, wherein the plurality of minimum voltage values and maximum voltage values are stored in the form of arrays in an extensible markup language (XML) file.

19. The computing system of claim 15,
wherein the layout program is further configured to add one or more dummy fill structures or layers to the layout design for the integrated circuit device; and
wherein the stored second plurality of maximum voltage change values are utilized to verify that the layout design with the added one or more dummy fill structures or layers satisfies the one or more high voltage design constraints.

20. A non-transitory computer readable storage medium having data stored therein representing software executable by a computer, the software including instructions to:
receive a schematic diagram of an integrated circuit device;
generate, by a simulation program, a first transient simulation of the integrated circuit device based on the schematic diagram;
determine, by a dynamic voltage generation program, from the first transient simulation of the integrated circuit device a plurality of maximum voltage change values between conductor networks within the schematic diagram of the integrated circuit device, wherein a first maximum voltage change value of the plurality of maximum voltage change value includes a difference between a maximum voltage value at a first node and a maximum voltage value at a second node; and
utilizing the plurality of maximum voltage change values to generate a layout design for the integrated circuit device according to one or more high voltage design constraints.

\* \* \* \* \*